(12) United States Patent
Buffet

(10) Patent No.: US 9,511,459 B2
(45) Date of Patent: Dec. 6, 2016

(54) AUTOMATIC SYSTEM FOR QUICK DROPPING OF THE BATTERY, INTEGRATED TO AN ELECTRICAL OR HYBRID VEHICLE, AND CONSEQUENCES ON ITS MAXIMUM LOADING WEIGHT

(71) Applicant: Denis Ernest Celestin Buffet, Paris (FR)

(72) Inventor: Denis Ernest Celestin Buffet, Paris (FR)

( * ) Notice: Subject to any disclaimer, the term of this patent is extended or adjusted under 35 U.S.C. 154(b) by 646 days.

(21) Appl. No.: 13/933,173

(22) Filed: Jul. 2, 2013

(65) Prior Publication Data
US 2015/0013130 A1    Jan. 15, 2015

(51) Int. Cl.
*B60R 16/04*    (2006.01)
*B23P 19/04*    (2006.01)
*B60L 11/18*    (2006.01)

(52) U.S. Cl.
CPC .............. *B23P 19/04* (2013.01); *B60L 11/185* (2013.01); *B60L 11/1818* (2013.01); *B60L 11/1822* (2013.01); *B60L 11/1824* (2013.01); *B60L 11/1877* (2013.01); *B60L 2240/80* (2013.01); *Y02T 10/7005* (2013.01); *Y02T 10/705* (2013.01); *Y02T 10/7072* (2013.01); *Y02T 90/121* (2013.01); *Y02T 90/124* (2013.01); *Y02T 90/128* (2013.01); *Y02T 90/14* (2013.01); *Y10T 29/53796* (2015.01)

(58) Field of Classification Search
None
See application file for complete search history.

(56) References Cited

U.S. PATENT DOCUMENTS 3,617,675 A * 11/1971 Pohm ...................... H01H 1/502
                                                       200/260
4,087,895 A *  5/1978 Etienne .................... B60K 1/04
                                                        254/93 HP
(Continued)

OTHER PUBLICATIONS

Examiner's Amendment and Approval via E-Mail, attached as pdf.*
Second E-mail providing approval to Ex Amend, attached as pdf.*

*Primary Examiner* — Joseph J Hail
*Assistant Examiner* — Brian Keller

(57) ABSTRACT

The invention relates to a system for installing or uninstalling a removable battery of an electric or hybrid vehicle characterized in that the system is fully integrated in the vehicle and does not require any outside assistance. To summarize, the jack (3) can vertically handle and drop the battery (2) when the locks (4) securing the battery below the vehicle (1) floor are open. For reinstalling the battery, the parking assistance system of the vehicle guides the vehicle above the battery, whereas the lifting device can cope with the unavoidable positioning errors. This battery dropping system is useful for batteries exchange, batteries renting or maintenance, and for adapting the battery's configuration to the forecasted loads or usages of the vehicle. Important cost and fuel savings along $CO_2$ emission cuts are expected from this device. In fact, the vehicle no longer carries a heavy battery when it is not necessary. Even more, adapting batteries to vehicle usages allows decreasing vehicle design loads with impacts on costs and vehicle performances. In addition, the device can also be used as an automatic and high-power electrical connector.

6 Claims, 10 Drawing Sheets

(56) References Cited

U.S. PATENT DOCUMENTS

| | | | | |
|---|---|---|---|---|
| 5,426,589 | A * | 6/1995 | Kitagawa | B60L 11/1851 320/136 |
| 5,631,832 | A * | 5/1997 | Hagenbuch | G01G 19/08 340/989 |
| 6,406,000 | B1 * | 6/2002 | Raz | B62D 43/045 224/42.23 |
| 8,146,694 | B2 * | 4/2012 | Hamidi | B60K 1/04 180/68.5 |
| 2005/0035879 | A1 * | 2/2005 | Gotzig | B60Q 9/006 340/932.2 |
| 2009/0273310 | A1 * | 11/2009 | Flack | B60L 11/1818 320/107 |
| 2010/0071979 | A1 * | 3/2010 | Heichal | B60K 1/04 180/68.5 |
| 2010/0145717 | A1 * | 6/2010 | Hoeltzel | B60K 1/04 705/1.1 |

* cited by examiner

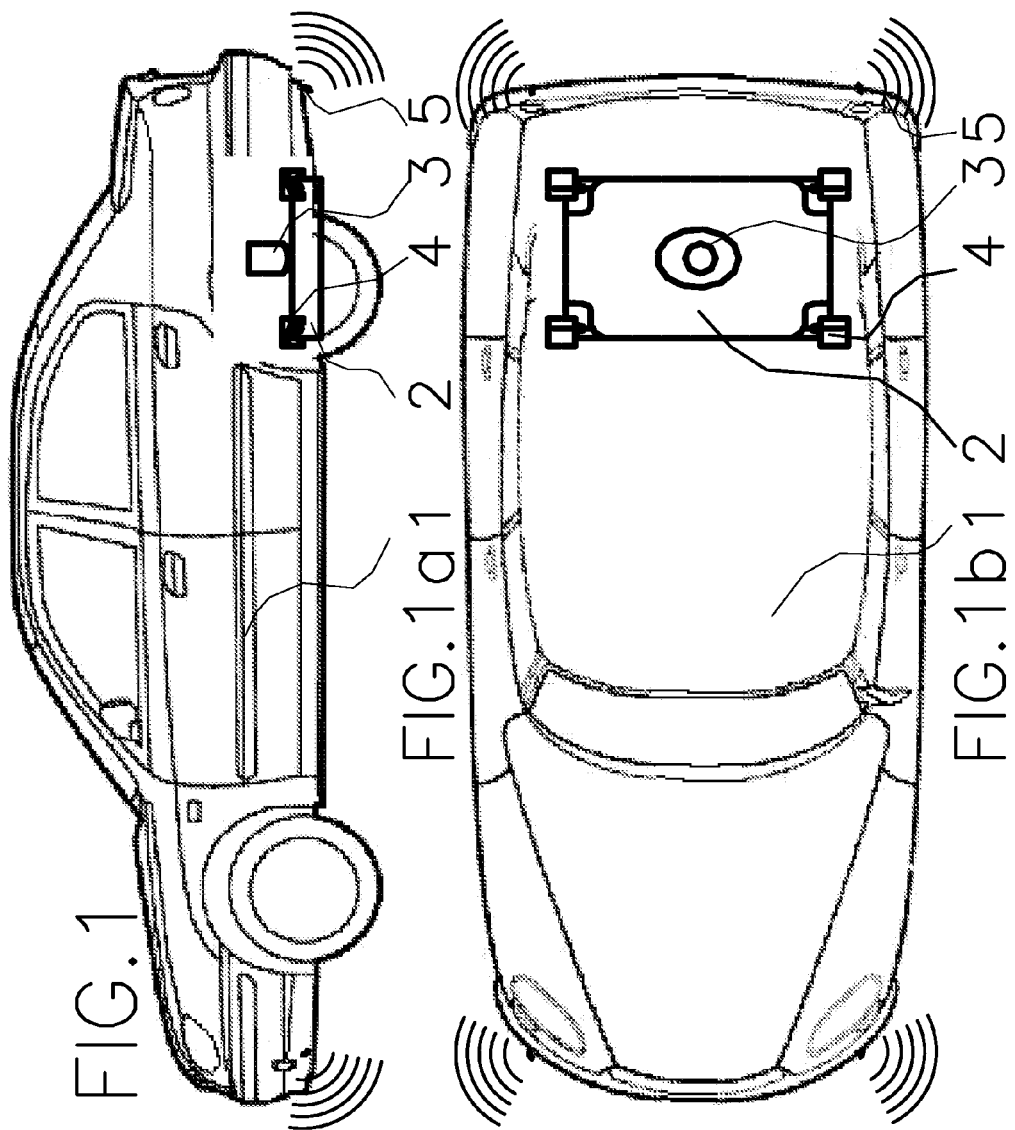

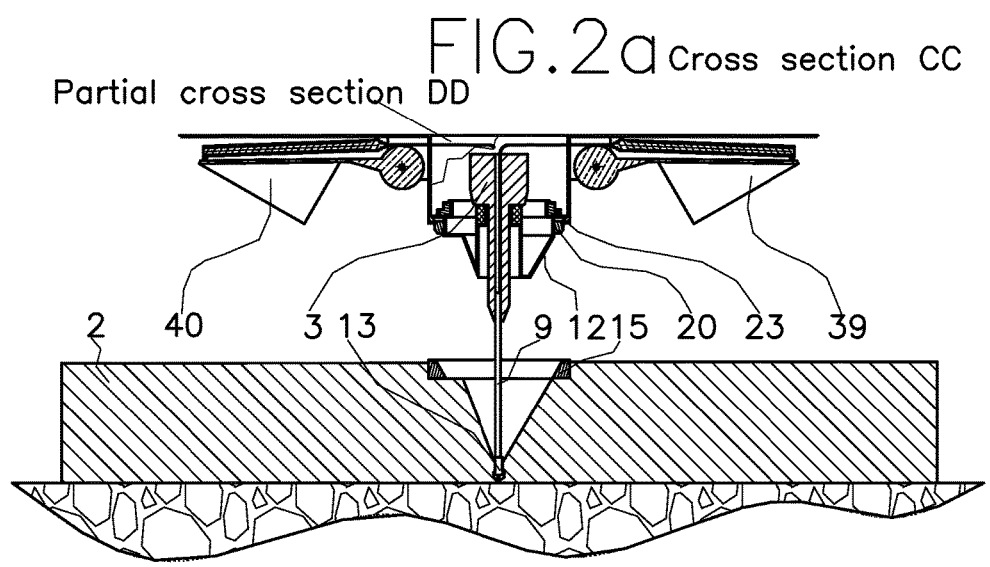
FIG. 2a Cross section CC
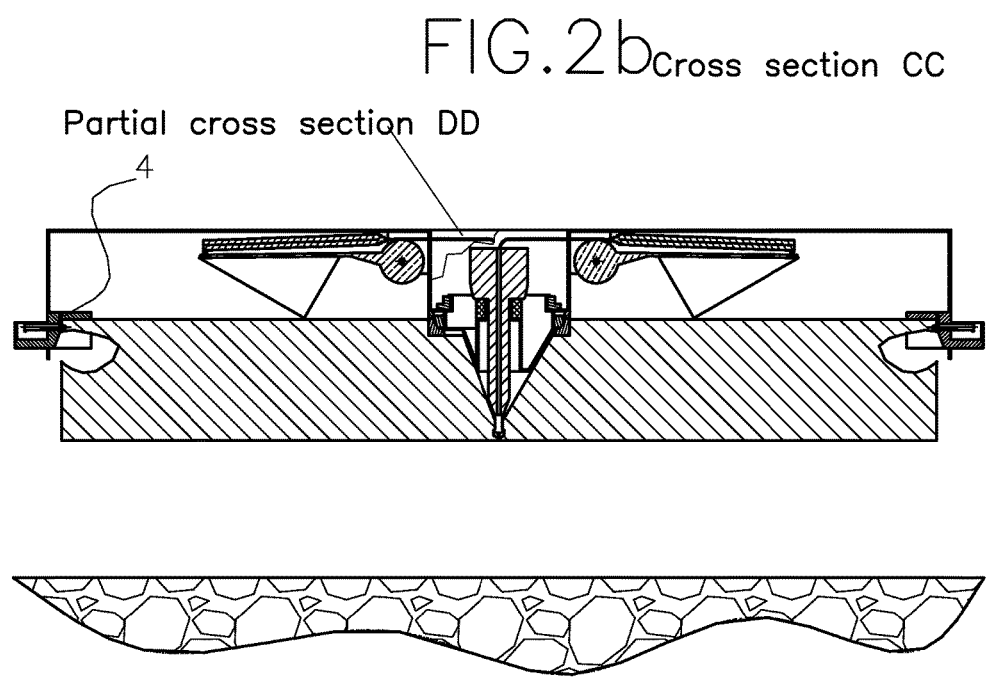
FIG. 2b Cross section CC

Partial cross section DD

Cross section CC

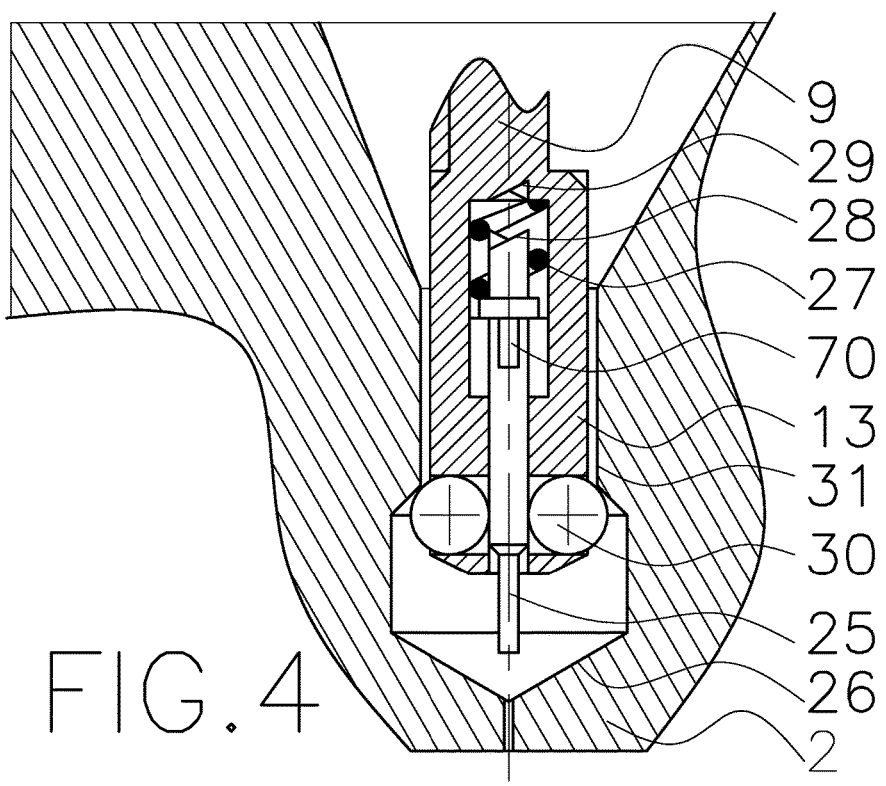

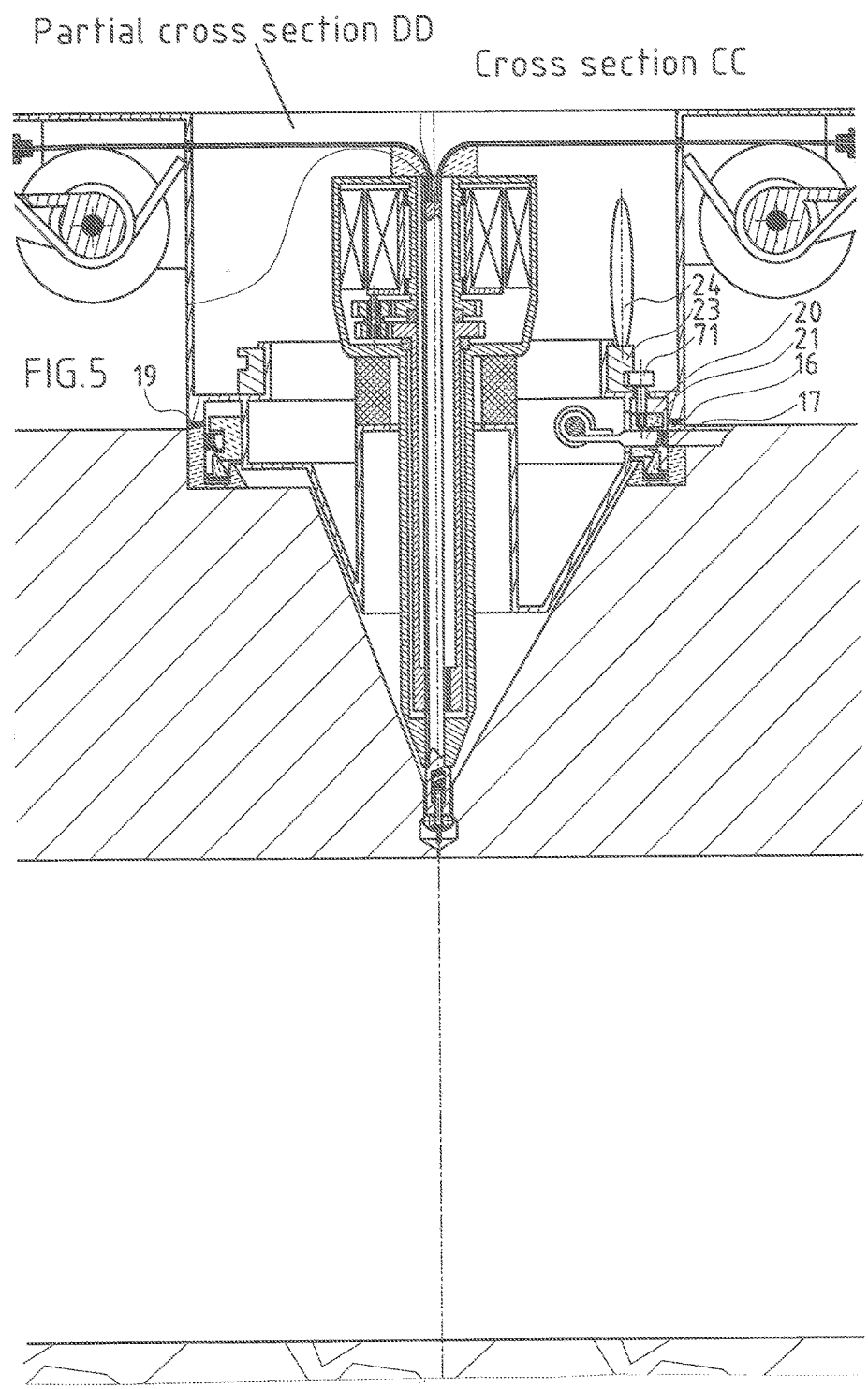

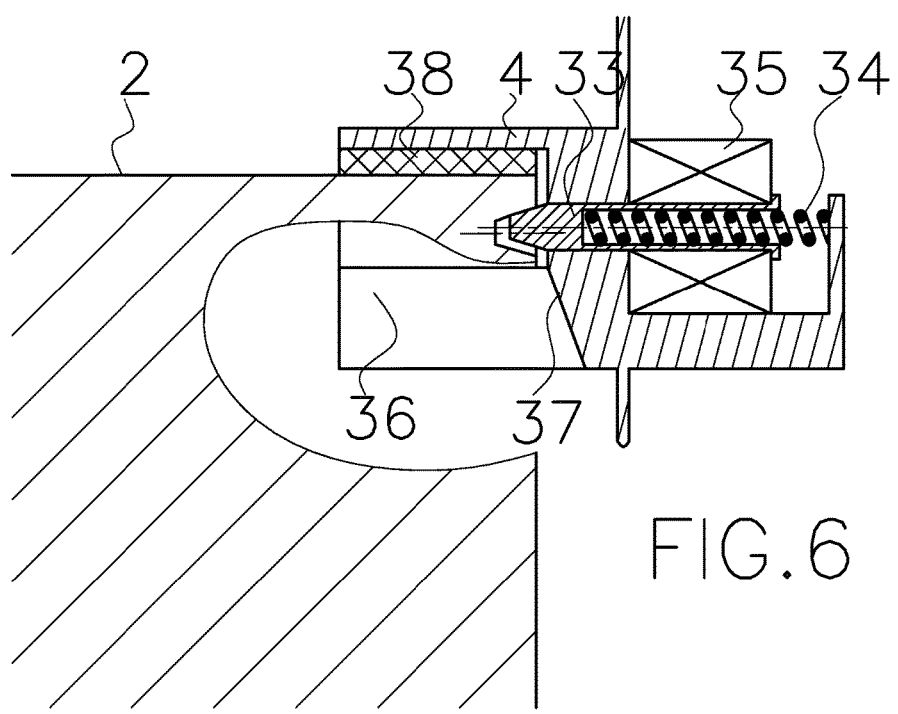

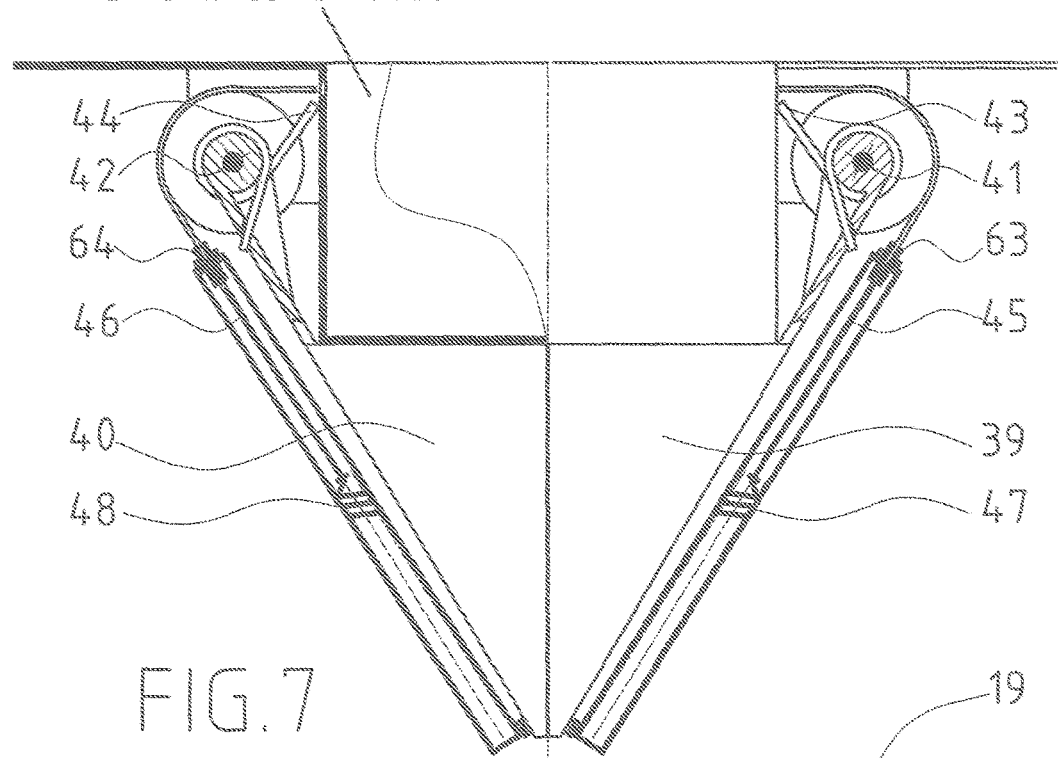
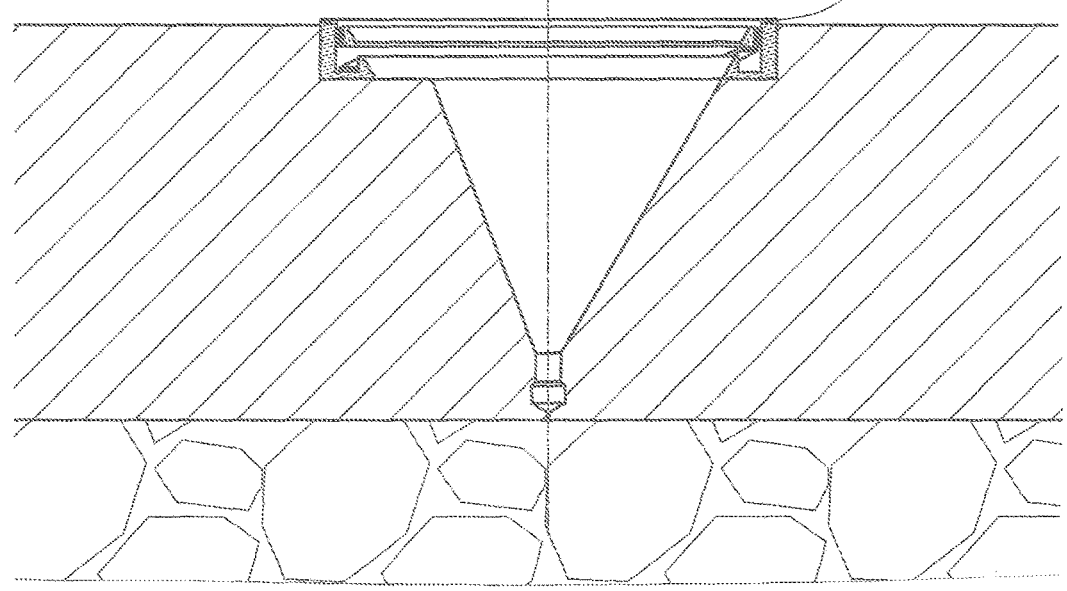

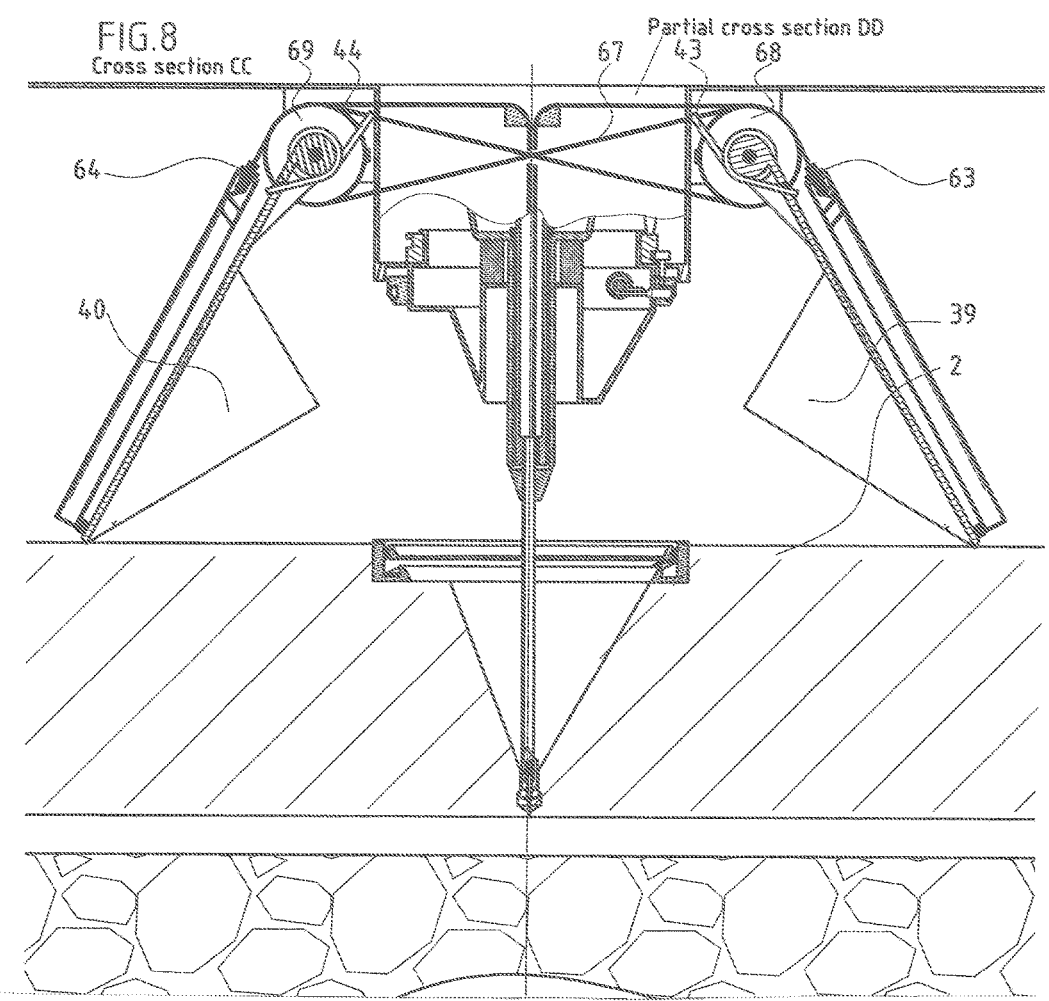

Cross section CC

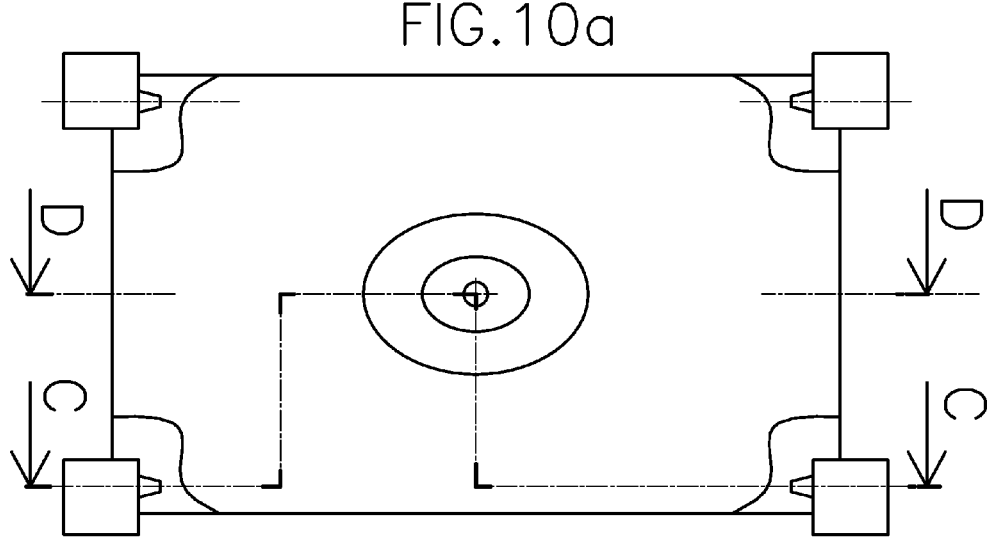
FIG.10a
FIG.10
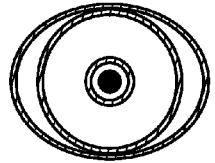
FIG.10b
Section B
(A-B from Fig.3)
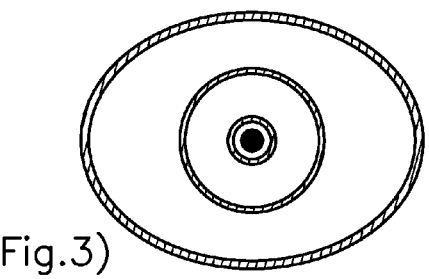
FIG.10c
Section A

AUTOMATIC SYSTEM FOR QUICK DROPPING OF THE BATTERY, INTEGRATED TO AN ELECTRICAL OR HYBRID VEHICLE, AND CONSEQUENCES ON ITS MAXIMUM LOADING WEIGHT

FIELD OF THE INVENTION

The invention relates to a system for installing or uninstalling the battery of an electrical or hybrid vehicle with the particularity that it does not require any external means or assistance. So it is a fully integrated system in the vehicle while it remains simple.

The invention also relates to the vehicle weight and to its maximum loading weight.

BACKGROUND TO THE INVENTION

Battery for electric or hybrid vehicles might be frequently installed or uninstalled for many reasons:
If a discharged battery should be permuted with a charged one,
If the battery is rented or shared,
For maintenance purpose,
For safety after an accident,
When the battery has to be adapted according to the vehicle usages such as autonomy, weight, availability of recharging stations and so on. . . .

Install and uninstall a vehicle battery are complex operations due to: its weight, its size, its brittleness, its relative high voltage, its ventilation needs, its location under or inside the vehicle and its high cost. Usually they require heavy means of handling, even robots and highly qualified staff. Even integrated to the vehicle, these operations are subject to many patents such as WO/2002/004275, DE 31 21 698 A1, U.S. Pat. No. 3,799,063 A, CH 184 758 A, U.S. Pat. No. 5,305,513 A. They all describe complex devices or heavy means of handling.

The purpose of the system according to the invention is to avoid these disadvantages by integrating, inside the vehicle, a simple and cheap device for handling the removable battery which does not require any outside assistance or skill staff.

As the system should provide an automatic electrical connection with the battery, It also provides an automatic connection for a plug of an eventual high-power charger. The current trend is to minimize the recharge time that implies higher and higher power connectors. Those are less and less easy to handle for human, and they are more and more difficult to integrate esthetically on the vehicle body. The device according to the invention mitigates these difficulties.

The battery weight can reach 250 Kg, which needs to be supported by the vehicle structure. Either it induces an additional structure weight which almost doubles the impact, or the maximum working load has to be reduced. At the end, electric vehicles are relatively heavy. The device according to the invention mitigates this difficulty.

SUMMARY OF THE INVENTION

An electric jack is vertically fixed on the vehicle body, preferably behind the rear seats of the vehicle. From this place, it can handle and drop a removable battery installed below the vehicle floor. When the battery is up, a connector, concentric with the jack, can connect or disconnect the battery with the vehicle. When the battery is down, an automatic grasping head, at the end of the jack rod, can drop or clasp the battery. The purpose is to install or uninstall the battery without any external assistance. For pre-positioning the vehicle against the battery, the system uses the existing parking assistance system while the lifting device is able to accommodate the remaining inaccuracy gap. This device is useful not only for the battery exchange but also to adjust the vehicle load according to the actual needs and the economics.

DETAILED DESCRIPTION

The device according to the invention advantageously uses the existing system of assistance for parking the vehicle to pre-position the vehicle in front of the dropped battery. Note that such positioning system is more and more common on to day vehicles. The use of the parking assistance system can be total or partial if sensors are dedicated to this particular pre-positioning. In both cases, the final handling system of the battery should be compatible with the pre-positioning accuracy, that is to say, a few centimeters.

To be done, an electric jack to handle the removable battery is fixed on the vehicle body and centered on the vertical through the gravity center of the battery. It is preferably installed just behind the rear seats of the vehicle, in the trunk. It has the capability to oscillate slightly around the vertical thanks to a kneecap or an elastic support.

The head of the jack rod is guided inside a conic hole arranged in the battery at the vertical of its center of gravity. It makes possible to absorb the pre-positioning gap by inclining the jack (roughly until 10°). When the low point inside the battery guidance cone is reached, the jack head has an automatic grasping function. For that it has a central feeler which alternates battery grasping and unclasping at each push at the end of the jack rod when the feeler touches the bottom of the cone. It is like a bi-stable mechanism of a retractable ball-point pen.

Despite the battery weight, the power of the jack does not exceed one hundred Watts, because of low handling speed. Consequently, it is not an expensive accessory. Moreover, the reduction ratio is such that the jack is not reversible; thus, the battery cannot be driven down without current.

During the battery handling, the battery adherence to the ground is reduced what makes the realignment with the vertical of the jack possible. In addition, to maintain the battery roughly horizontal, the loose of the grasping head limits the battery inclination. The smallness of the jack stroke compared with the battery size has the same effect. Note that the system has also to absorb displacements of the vehicle during the battery weight transfer.

During its lifting, the battery positioning is completed by a cone, in cooperation with the battery cone, fixed concentric with the jack on the vehicle body. The two cones ensure not only the coincidence of the vertical center lines but also the angular position in the horizontal plane because of their elliptic base.

At the end of conical guidance, the precision of positioning is also sufficient for allowing electric connection between a connector on the vehicle side and a connector on the battery side, both arranged concentric at the base of the guidance cones. The connectors are in cooperation. The female connector is preferably on the battery side while the male connector is on the vehicle side, but the opposite is also possible.

This arrangement confers a great circumference to the connectors allowing large surfaces of contact suitable for high-current intensities of several hundreds of amps. They are also enough space for information transfer contacts without being parasitized by the proximity of high-intensity currents.

To prohibit the access to the electrical contacts while the battery deposited, they are covered and protected by a concentric mask only pushed back by a special shape of the vehicle connector at the time of the connection. As it is jack operated, the opening effort can be strong for people safety.

The connector on the vehicle side can also be supplemented by a concentric circuit breaker manually handled to isolate the removable battery for emergency or maintenance purpose.

A gasket ensures the sealing of the connectors against dust or water projections without disturbing the natural ventilation of the battery which remains outside of the vehicle body. If a cooling air flow is required for the battery, the preferred solution is to transfer the air flow through an annulus space created between the two guiding cones in cooperation tightened by two horizontal gaskets between the cone surfaces.

When battery is close to its final position below the vehicle, let say at the end of conical guidance, the precision of positioning is of a few millimeters. They are rid off by fine guidance means arranged on at least three locks, preferably located at the battery corners. Once the removable battery in place, they provide a failsafe locking. Many combinations of springs and electromagnetic coils can ensure this function in case of power failure. They can also be fitted with positioning encoder to supervise the operation in accordance with known techniques.

The battery dropping is done in accordance with the here above process in reverse order. At the end of the dropping and after the pullback of the jack rod, two half articulated caps come to protect the system from dust and water projections. To avoid additional actuators they are retracted by the moving parts during the battery vertical stroke.

These half-caps can also stabilize the battery in an approximate horizontal plane during its vertical movements. In this function, they are synchronized with gears, chains, wires or other means. Such as, retraction effort of the half-caps concentrates on the side of the battery more raised in a tendency to balance it toward the horizontal plane. To avoid multiplication of motorizations, the half-caps are directly or indirectly actuated by the jack.

As seen in the patents US 2012-0309574-A1 and US 2012-0309575-A1, hybrid vehicles can get a low powerful electrical propulsion chain working close to the electrical balance and small electrical autonomy. Consequently battery can be small compare to use electrical energy from the grid which implies a bigger battery or a second dedicated battery to the plug in. This second larger and heavier battery should be adapted to the vehicle usage which is subject to change. It is why droppable battery option while keeping vehicle operational has to be considered.

There are many solutions to keep a relative mobility without the vehicle main battery, for instance: to come back to a non-hybrid mode, to have another energy source such as flywheel, compressed air . . . , to have a temporary battery or a provisional electrical wire connection for short displacements. . . . Note that batteries can be either switched or connected in parallel through some well-known electronic devices.

Obviously, the battery weight needs to be supported by the vehicle structure. Either it induces an additional structure weight which almost doubles the impact of the battery weight, or the vehicle maximum working load has to be drastically reduced. Consequently, it might be advantageous to embark or to disembark a second battery according to the commercial load into the vehicle. Very important cost cuts can be expected from this load adjustment while debate about car with one people onboard is smoothed.

A safety automatic device can reduce vehicle maximum speed when an unexpected overload occurs during a trip. Software can estimate the vehicle load from information coming from the ECU provide to add information from a grade sensor. Then results can be integrated by the ECU to set a speed limit. Load information can also be measured directly on the vehicle suspension or even from the tire pressure which have to be monitored elsewhere.

The control over the system, particularly the battery in its final position, can be based on the signature of the current intensity in the jack in accordance with some known technics. The human control over the system by the driver is preferably made through a pushbutton of push to make type. This button should be ideally located inside the vehicle, close to the steering wheel. The target is to minimize accident risk, although nobody has to be below the vehicle without consignment, same for much other vehicle equipment.

The system can also be used as an automatic connector for high-intensity charger. Currently, to minimize battery charging time, charger power is increasing and charger plug has to support higher intensity currents. On the other hand, battery connector is also designed for high intensity. So the plug arrangements can be same as those previously seen for the removable battery.

Arrangements on ground are slightly different. The plug, with its cables, should create a minimal obstacle with circulation. A system of springs or counterweights is under consideration for recalling the plug in its rest position.

Note that connector located below the vehicle, is no longer an esthetic problem for the vehicle body.

INDUSTRIAOUSNESS

This system is particularly intended for:
Electric vehicles which practice batteries exchange (a discharged battery against a charged one) in a special station. The interest within the system according to the invention is to simplify operations; handling equipment and staff assistance.
Electric vehicles which practice fast battery charge. The interest within the system according to the invention is to minimize the manual operations which are less and less hand able.
Hybrid vehicles which practice vehicle load control. The driver can adapt the batteries configuration according to the foreseeable use of his vehicle (required autonomy, vehicle load, recharging stations availability, economics, etc. . . . by keeping the second battery at the garage or adapting its capacity to his actual needs. The interest within the system according to the invention is that important CO2 cuts and fuel savings can be expected.

BRIEF DESCRIPTION OF THE FIGURES

The figures, hereafter, describe some possible and non-exclusive embodiments of the system according to the invention.

FIG. 1, shows a possible implantation of the system on the vehicle:
FIG. 1a, on a lateral view of the vehicle,
FIG. 1b, on a top view of the vehicle.
FIG. 2, shows a cross-section of the device:

FIG. 2a, just before the lifting of the battery,

FIG. 2b, after the lifting of the battery.

FIG. 4, shows a cross-section of the grasping device of the battery.

FIG. 5, shows a cross-section of the device after the lifting of the battery.

FIG. 6, shows a cross-section of the locking device of the battery.

FIG. 7, shows a cross-section of the protecting system.

FIG. 8, shows the follow-up system of the battery during its displacements.

FIG. 10, gathers cross sections and reference marks of the here above figures:

FIG. 10a, describes the cutting plans DD and CC of the figures,

FIG. 10b, is the cross section B of the guidance cone on the FIG. 3,

FIG. 10c, is the cross section A of the guidance cone on the FIG. 3.

DETAILED DESCRIPTION OF THE ILLUSTRATED EMBODIMENTS

Figure 3:
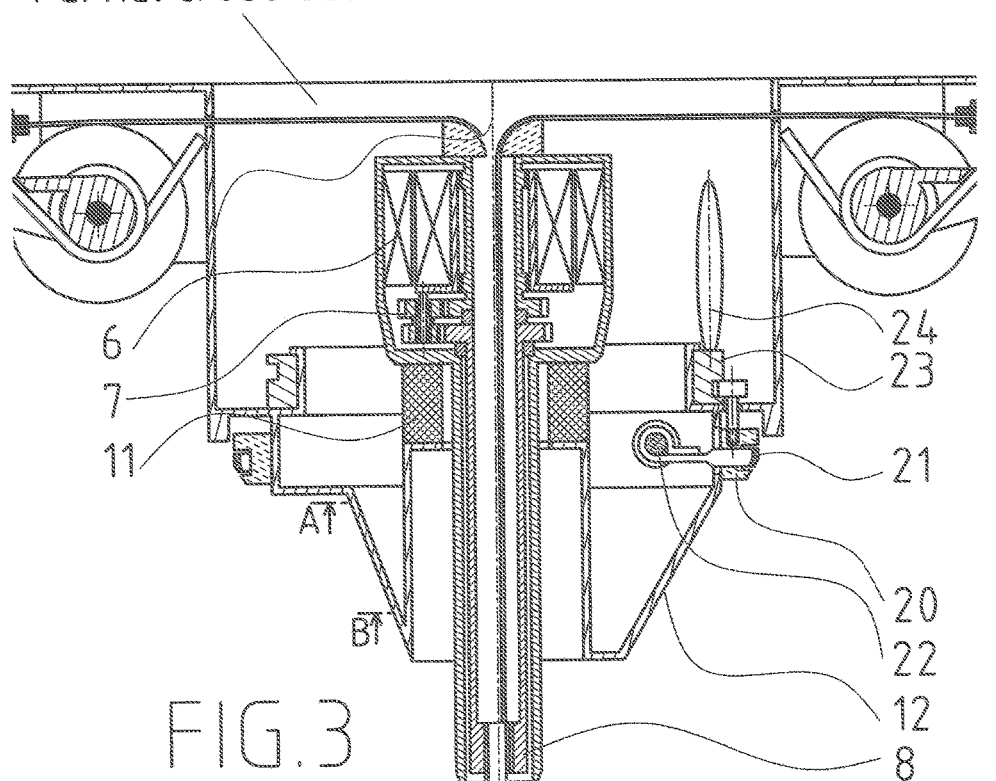
FIG. 3, shows a cross-section of the device before the lifting of the battery.

FIG. 1 gives a possible implantation on the vehicle (1) of the main parts within the system according to the invention, on a side view referenced 1a, on a top view referenced 1b. They are located on the figures: the removable battery (2), the oscillating jack (3), the battery locks (4) at the battery corners, and finally, the four probes (5) of the parking assistance system. This last is used to preposition the vehicle against some external elements like garage walls or beacons, which have not been represented in the figures. To improve the vehicle repositioning, the system software can memorize and then take into account the dropping location of the battery.

FIG. 2 shows a vertical cross-section referenced CC-DD of the device according to the invention with: the oscillating jack (3), its rod (9) with its grasping head (13), the removable battery (2) and its female connector (15), the guidance cone with an elliptic section (12), the male connector (20) with its optional circuit breaker (23), and finally, the two half-caps (39) and (40). The FIG. 2a represents the device just before the lifting and the FIG. 2b after the lifting of the battery (2). Once in place, the battery is secured by the locks (4). The elliptic section (12) of the guidance cone provides the angular positioning of the battery (2) against the vehicle during the vertical lift.

FIG. 3 shows a vertical cross-section referenced CC-DD of the device according to the invention with the electric driving motor (6) and its reducer (7) which actuates the nut (8) in rotation. The nut (8) pushes the threaded rod (9) of the jack (3) which is blocked in rotation and guided in translation by the bore (10). The jack is mounted here on an elastic ring (11) allowing vertical inclination as a kneecap would also do it. The fix cone (12) with an elliptic base guides and directs the removable battery (2) during its lifting. For that purpose, the battery (2) has a conical shape hole (14) to cooperate with the cone (12). The insulated base of the female connector (15) is fixed concentric on the removable battery (2). Its electrical contacts (16) are covered by a toric mask (17) vertically pushed by the spring (18) so that it is pushed back downwards by the male connector (20) on the vehicle side at the time of connection. The gasket (19) ensures the sealing of the connection which can be at a relatively high voltage. The fixed part receives the male connector (20) with its positive and negative contacts (21) of the D.C. bus (22). The contacts for the information bus are not represented but are similar in more reduced dimensions. In option, the female connector (20) can be pulled upwards and disconnected while manually turning the handle (24) of a concentric cam (23). This last is operated in emergency or for maintenance purpose. Generally, the control over the system is ensured by comparing the signature of the current intensity in the actuator (6).

FIG. 4 shows a vertical cross-section referenced DD of the device for grasping the battery at the end the jack rod (9). The system is similar to a mechanism of a retractable ball-point pen. A feeler (25) comes to press against the bottom (26) of the battery cone by compressing the spring (27) until putting in contact the two cams (28) and (29) causing the rotation of the feeler (25) of a half-step. At each pressure, therefore, at each half-step, the feeler (25) rests alternatively on the top or the bottom of a third cam (70). The feeler (25) radially pushes at least three balls (30) either on its large diameter or on its small diameter. Resting against the small diameter, the head (13) passes through the battery boring (31) whereas it does not do any more resting against the large diameter. It results that after each pressure of the feeler (25) on the bottom (26), the grasping head (13) alternatively grasps and unclasp the battery (2). The good fixing is controlled by the current intensity in the actuator. At the beginning of the lifting, the battery horizontality is roughly maintained by its low relative height compare to its horizontal dimensions and by the limited loose between the boring (31) and the grasping head (13). The orientation is maintained by the residual friction with the ground and the friction of the balls (30) in the conical boring (31). If the battery dimensions are such that they are insufficient to maintain battery horizontality, an optional device is described here after.

FIG. 5 shows a cross section referenced CC-DD of the device according to the invention, with the removable battery in place and the electric connection established. At the end of the lifting, the male connector (20) pushed back the insulated mask (17) from the female connector to establish the electric contact between the terminals (21) and (16). The gasket (19) finalizes the sealing of the connector against dust and water projections. The cam (23) is operated by the handle (24) from inside the vehicle. It allows pulling up the bolts (71) with the male connector (20) in order to disconnect the contacts (21) and (16). This system makes it possible to isolate the battery for emergency or maintenance needs.

FIG. 6 shows a vertical cross section referenced CC of the locks (4) to secure the removable battery (2) while in place according to the invention. The battery (2) is strongly blocked in the position by the conical fingers (33) pushed by the springs (34) of at least three locks (4) fixed on the vehicle body. Position detectors can be fitted in order to make sure of the locking according to known technics. At the battery dropping, the fingers (33) are pushed back by the electromagnets (35) following a failsafe concept. The locks have their own guidance means (36) and (37) for the battery corners. A shock absorber (38), out of elastomer, maintains a minimal effort to avoid shocks and vibrations. Retractable caps may also come to cover and protect these devices.

FIG. 7 shows a vertical cross section referenced DD of the system according to the invention, both half-caps coming to cover and protect the device and particularly the male connector after the dropping of the battery. Both half-caps (39) and (40) are articulated around their pins (41) and (42). They are simultaneously pushed against each other and on the gasket (19) rest by the springs (43) and (44). Two wires (45) and (46) are connected at the back of the jack rod to actuate the half-caps (39) and (40) in rotation. The wires (45) and (46) are tensioned by the springs (47) and (48) to absorb excess of stroke. Adjustable thrusts (63) and (64) limit the stroke of the springs (47) and (48) to cause a beginning of opening of the half-caps (39) and (40) by dominating the contrary effort of the springs (43) and (44). The battery ensures in continuation the full opening of the half-caps (39) and (40) during its lift up.

FIG. 8 shows a cross section referenced CC-DD of the optional system for maintaining the battery roughly horizontal during its displacement. The thrusts (63) and (64) are adjusted so that one of the half-caps (39) or (40) makes contact with the higher point of the battery (2) when they are opened at approximately 60° and that the battery raised only few centimeters. The caps (39) and (40) are then opened by the battery (2) itself during its lifting. To ensure a rough horizontality, the half-caps (39) and (40) are synchronized by chains, gears, and wires or others. . . . Here it is a wire (67) out of crossed loop driving the pulleys (68) and (69) of both half-caps (39) and (40). Because of the synchronization, the actions of the two springs (43) and (44) are combined to restore the horizontality of the battery.

Figure 9:
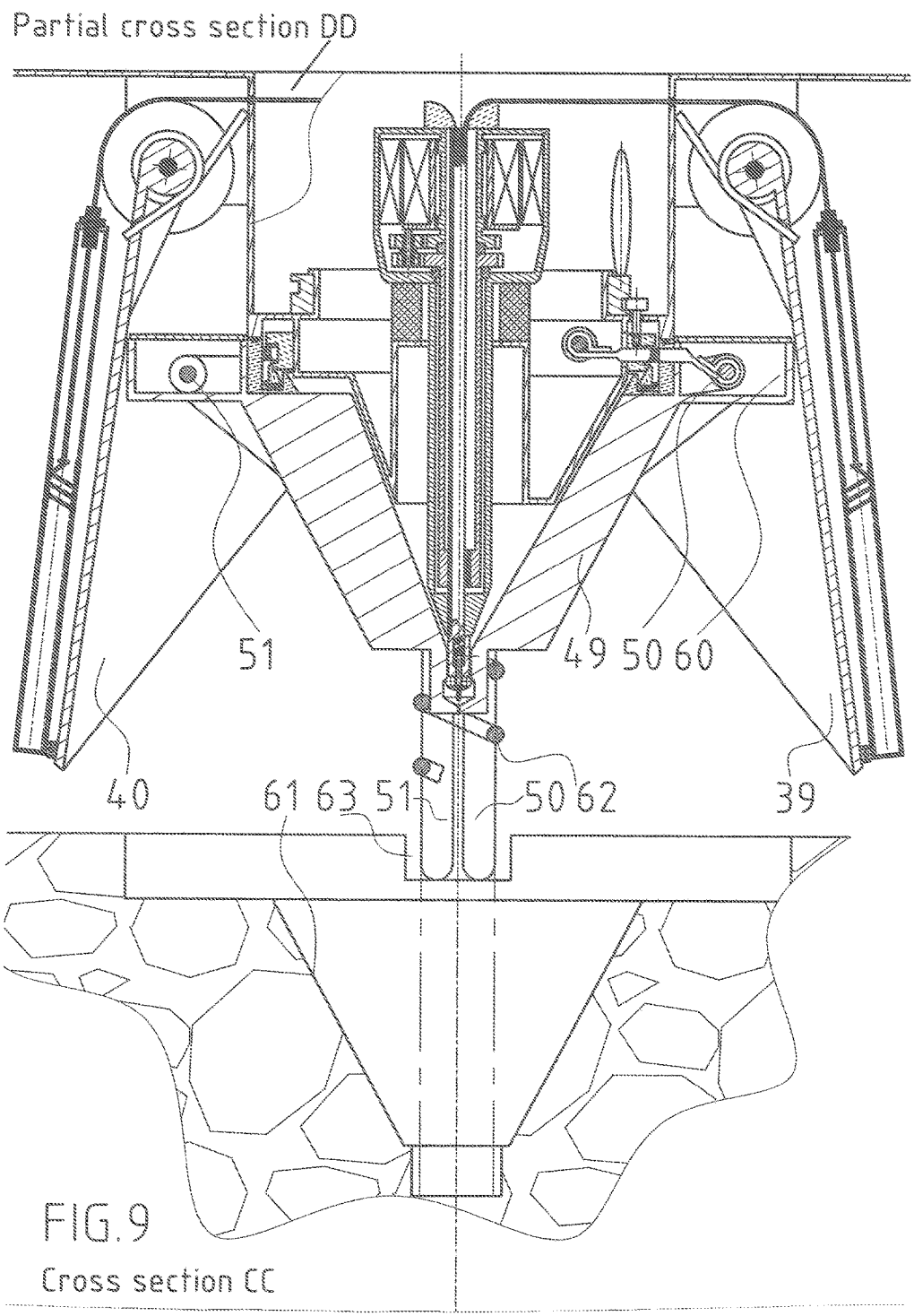
FIG. 9, shows a cross-section of the system in its configuration for an automatic connectors for high-intensity charger.

FIG. 9 shows a cross section referenced CC-DD of the system according to the invention in its function of automatic plug connector for high-intensity charger. The female plug (49), at the end of charger cables, reproduces all the arrangements of the female connector described here above for the removable battery with slight differences. The terminals of the battery are replaced by two electric cables (50) and (51) which circulate in the gallery (60) of the plug connector (49) to dive laterally towards the charger (not represented) by forming an S in the vertical plane. A conical form (61) or a dedicated support, arranged at the ground level, receives the plug (49) under recall action of a spring (62) or a counterweight. Then the two cables (50) and (51) circulate in a gutter (63) dug through the soil so that the obstacles with the traffic are minimized. Both half-caps (39) and (40) remain in protection during the electrical connection. The device remains similar by reversing male and female functions of the connectors.

FIG. 10 provides the location of the cross-sections referenced A, B and CC of the guidance cones on the figures from 1 to 9. The cross section DD is the vertical plan containing the jack axis transverse to the vehicle more convenient to represent the other parts of the system. The FIG. 10a shows the cutting plan CC of the cross sections used for the guidance cones and the cutting plan DD used for the other parts of the system, the FIG. 10b gives the cross section B of the guidance cone on the FIG. 3, the FIG. 10c gives the cross section A of the guidance cone on the FIG. 3.

The invention claimed is:

1. Vehicle-mounted device for installing or dropping a removable battery of an electric or hybrid vehicle, comprising:
   An electric jack, fixed on a vehicle body via a means for allowing pivoting of the jack relative to the vehicle body and located directly over the center of gravity of a removable battery, the jack comprising a rigid telescoping rod, the rod being extendable and retractable in a vertical direction, and the jack able to vertically handle the battery while compensating position gaps,
   An automatic grasping head, fixed at an end of the jack rod, having means to alternately grasp or unclasp the removable battery at each push of the jack,
   A guiding cone fixed concentric with the jack on the vehicle body for guiding the removable battery,
   The battery having with a conical shaped hole to cooperate with the guiding cone,
   An electrical connector also installed concentric with the jack at the base of the guiding cone,
   At least three locks for securing the removable battery once in place under the vehicle.

2. The device as claimed in claim 1, wherein said electrical connector has contacts on the battery covered and protected by a concentric insulated mask only pushed back by a special shape of the vehicle connector at the time of the connection.

3. The device as claimed in claim 1, further comprising a rotatable concentric cam allowing to manually pull the connector on the vehicle side upward and consequently to disconnect a connector on the battery.

4. The device as claimed in claim 1, wherein said locks are failsafe electromagnetic locks.

5. The device as claimed in claim 1, further comprising two articulated half-caps retracted by the jack of the device during the battery installation to protect the device from dust and water projections.

6. The device as claimed in claim 5, wherein said articulated half-caps are synchronized for helping to maintain the battery in an approximate horizontal plane during the battery vertical movements.

* * * * *